US012238608B2

(12) United States Patent
Kreykes et al.

(10) Patent No.: US 12,238,608 B2
(45) Date of Patent: Feb. 25, 2025

(54) MODIFYING VEHICLE BEHAVIOR BASED ON BOUNDARY TYPE

(71) Applicant: Deere & Company, Moline, IL (US)

(72) Inventors: Todd A. Kreykes, Ankeny, IA (US); Tyler D. Schleicher, Ankeny, IA (US)

(73) Assignee: Deere & Company, Moline, IL (US)

( * ) Notice: Subject to any disclaimer, the term of this patent is extended or adjusted under 35 U.S.C. 154(b) by 159 days.

(21) Appl. No.: 17/847,578

(22) Filed: Jun. 23, 2022

(65) Prior Publication Data

US 2023/0413711 A1 Dec. 28, 2023

(51) Int. Cl.
*H04W 4/021* (2018.01)
*G05D 1/00* (2006.01)

(52) U.S. Cl.
CPC .......... *H04W 4/021* (2013.01); *G05D 1/0061* (2013.01); *G05D 1/0088* (2013.01); *G05D 1/0221* (2013.01); *G05D 1/0223* (2013.01)

(58) Field of Classification Search
CPC .. A01B 69/008; A01B 79/005; G05D 1/0061; G05D 1/0088; G05D 1/0219; G05D 1/0221; G05D 1/0223; G05D 1/229; G05D 1/6484; G05D 2105/15; G05D 2107/21; G05D 2109/10; H04W 4/021; H04W 4/40
See application file for complete search history.

(56) References Cited

U.S. PATENT DOCUMENTS

| | | | | |
|---|---|---|---|---|
| 10,395,115 B2 | 8/2019 | Kumar et al. | | |
| 2009/0037096 A1* | 2/2009 | Senneff | A01B 79/005 | 701/408 |
| 2009/0292426 A1* | 11/2009 | Nelson | A01C 21/005 | 701/50 |
| 2011/0153172 A1* | 6/2011 | Anderson | A01D 34/008 | 701/50 |
| 2014/0074360 A1* | 3/2014 | Rosa | G05D 3/12 | 701/50 |
| 2015/0201555 A1* | 7/2015 | Willgert | G05D 1/0274 | 701/26 |
| 2018/0348760 A1 | 12/2018 | Peverill et al. | | |
| 2019/0286153 A1* | 9/2019 | Rankawat | G05D 1/0246 | |

* cited by examiner

*Primary Examiner* — Khoi H Tran
*Assistant Examiner* — Nhi Q Bui
(74) *Attorney, Agent, or Firm* — Fenwick & West LLP

(57) ABSTRACT

A definition of a boundary corresponding to a geographic area in which an autonomous off-road vehicle (AOV) operates is accessed. The boundary definition includes a classification of each of a plurality of portions of the boundary as being of one or more boundary types, each boundary type associated with one or more vehicle behavior limitations. The AOV navigates to a target portion of the boundary corresponding to the geographic area. The target portion of the boundary is classified as being one or more target boundary types. In response to being within a threshold distance of the target portion of the boundary, the AOV modifies a behavior of the AOV based on the one or more vehicle behavior limitations associated with the one or more target boundary types.

20 Claims, 5 Drawing Sheets

400

400

Access a definition of a boundary corresponding to a geographic area in which an autonomous off-road vehicle (AOV) operates, the boundary definition including a classification of each of a plurality of portions of the boundary as being of one or more boundary types, each boundary type associated with one or more vehicle behavior limitations
410

Navigate to a first target portion of the boundary corresponding to the geographic area, the first target portion of the boundary classified as being one or more first target boundary types
420

In response to being within a threshold distance of the first target portion of the boundary, modify a behavior of the AOV based on the one or more vehicle behavior limitations associated with the one or more first target boundary types
430

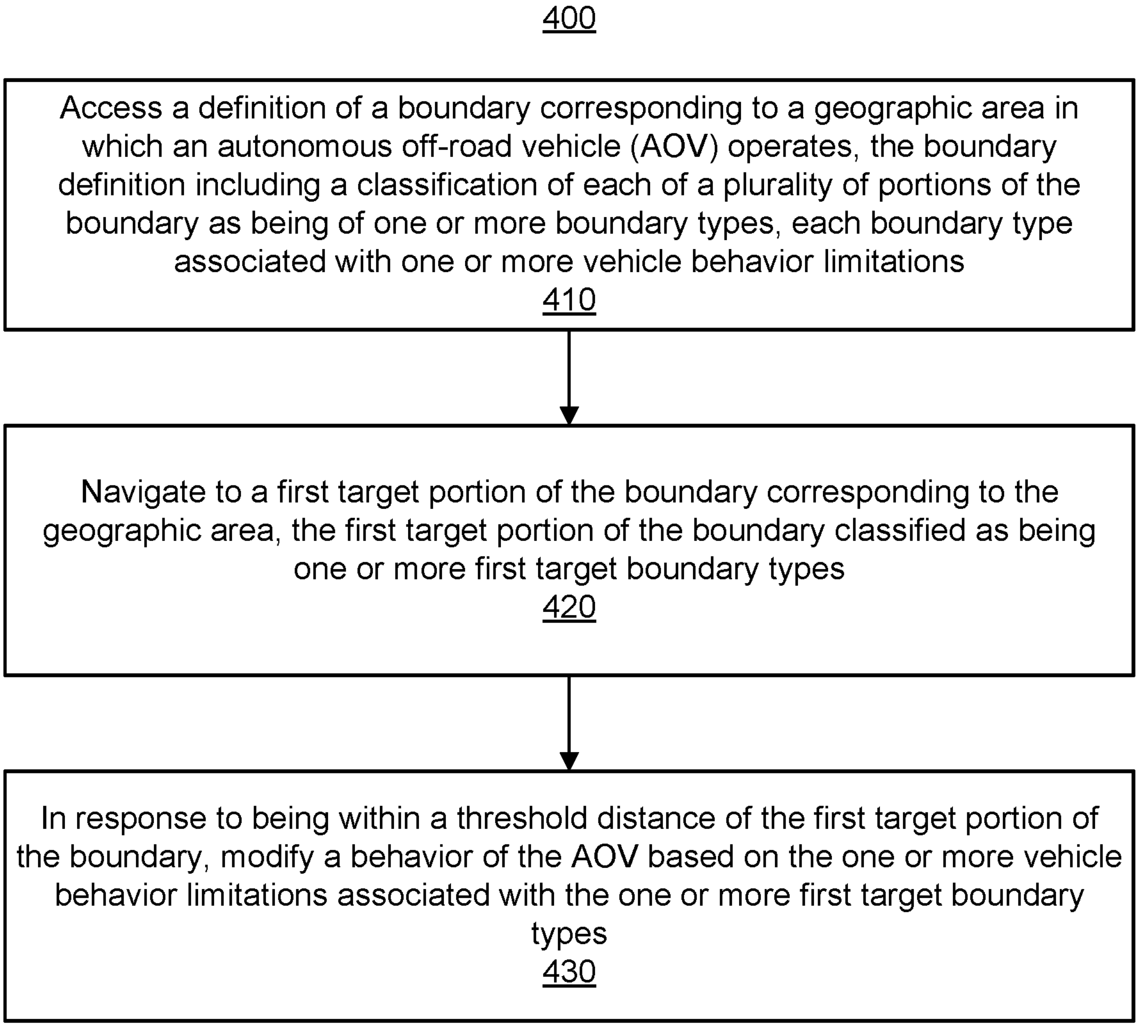

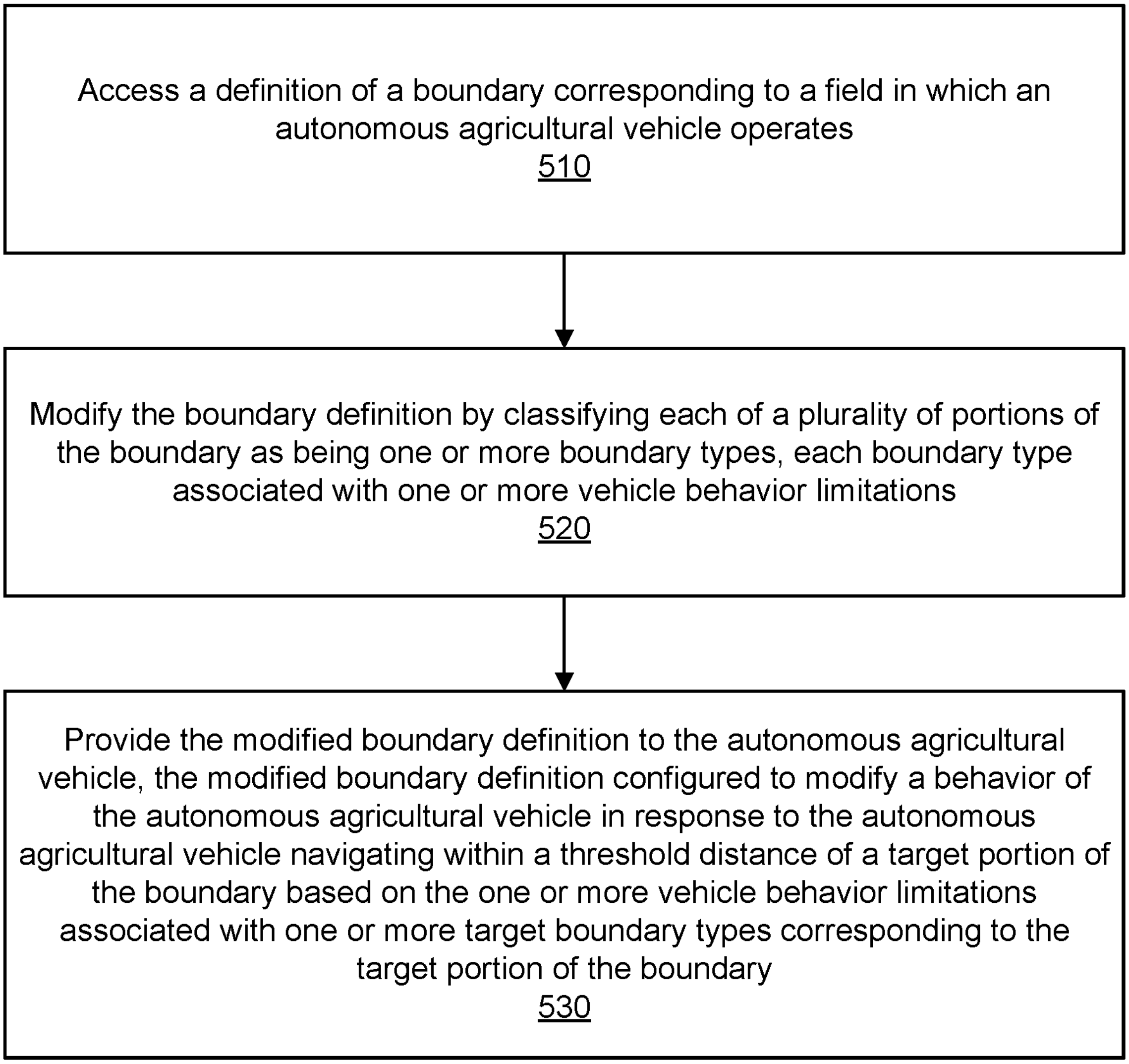

FIG. 5

Access a definition of a boundary corresponding to a field in which an autonomous agricultural vehicle operates
510

Modify the boundary definition by classifying each of a plurality of portions of the boundary as being one or more boundary types, each boundary type associated with one or more vehicle behavior limitations
520

Provide the modified boundary definition to the autonomous agricultural vehicle, the modified boundary definition configured to modify a behavior of the autonomous agricultural vehicle in response to the autonomous agricultural vehicle navigating within a threshold distance of a target portion of the boundary based on the one or more vehicle behavior limitations associated with one or more target boundary types corresponding to the target portion of the boundary
530

MODIFYING VEHICLE BEHAVIOR BASED ON BOUNDARY TYPE

TECHNICAL FIELD

The disclosure generally relates to the field of autonomous off-road vehicles, and specifically to autonomous navigation within a geographic area by an autonomous off-road vehicle.

BACKGROUND

An autonomous off-road vehicle (e.g., farming machine, construction machine) may autonomously operate in a geographic area (e.g., off-road environment, agricultural field, construction worksite) within a set or defined boundary of the geographic area. For example, a boundary of an agricultural field may be mapped out in advance of an autonomous farming machine entering the agricultural field. The autonomous farming machine may then perform various farming operations (e.g., tilling, planting seeds, fertilizing plants, treating plants for instance with weed or pest treatments, harvesting, and the like) autonomously in the field by generating a path plan based on the mapped boundary. However, it is difficult to autonomously navigate the farming machine along a guidance track of the path plan that is precisely matched to the mapped boundary due to different portions of the boundary having different conditions that require the autonomous farming machine to operate differently in the different portions.

SUMMARY

In one embodiment, a method includes a step of accessing a definition of a boundary corresponding to a geographic area in which an autonomous off-road vehicle (AOV) operates. The boundary definition includes a classification of each of a plurality of portions of the boundary as being one or more boundary types, each boundary type associated with one or more vehicle behavior limitations. The method further includes a step of navigating, by the AOV, to a first target portion of the boundary corresponding to the geographic area, the first target portion of the boundary classified as being one or more first target boundary types. The method further includes a step of modifying by the AOV, and in response to being within a threshold distance of the first target portion of the boundary, a behavior of the AOV based on the one or more vehicle behavior limitations associated with the one or more first target boundary types.

In another embodiment, a method includes a step of accessing, by a central server, a definition of a boundary corresponding to a field in which an autonomous agricultural vehicle operates. The method further includes a step of modifying, by the central server, the boundary definition by classifying each of a plurality of portions of the boundary as being one or more boundary types, each boundary type associated with one or more vehicle behavior limitations. Still further, the method includes a step of providing, by the central server, the modified boundary definition to the autonomous agricultural vehicle. The modified boundary definition is configured to modify a behavior of the autonomous agricultural vehicle in response to the autonomous agricultural vehicle navigating within a threshold distance of a target portion of the boundary based on the one or more vehicle behavior limitations associated with one or more target boundary types corresponding to the target portion of the boundary.

In yet another embodiment, an autonomous off-road vehicle (AOV) includes: a hardware processor; and a non-transitory computer-readable storage medium storing executable instructions that, when executed by the hardware processor, cause the AOV to perform various steps. The steps include a step of accessing a definition of a boundary corresponding to a geographic area in which the AOV operates. The boundary definition includes a classification of each of a plurality of portions of the boundary as being one or more boundary types, each boundary type associated with one or more vehicle behavior limitations. The steps further include a step of navigating, by the AOV, to a first target portion of the boundary corresponding to the geographic area, the first target portion of the boundary classified as being one or more first target boundary types. The steps further include a step of modifying by the AOV, in response to being within a threshold distance of the first target portion of the boundary, a behavior of the AOV based on the one or more vehicle behavior limitations associated with the one or more first target boundary types.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 is a flow chart illustrating a process for autonomous navigation based on a boundary definition including a classification of plural portions of the boundary as being of one or more boundary types, according to various embodiments.

FIG. 5 is a flow chart illustrating a process of a central server for generating a boundary definition including a classification of plural portions of the boundary as being of one or more boundary types, according to various embodiments.

DETAILED DESCRIPTION

Figure 1:
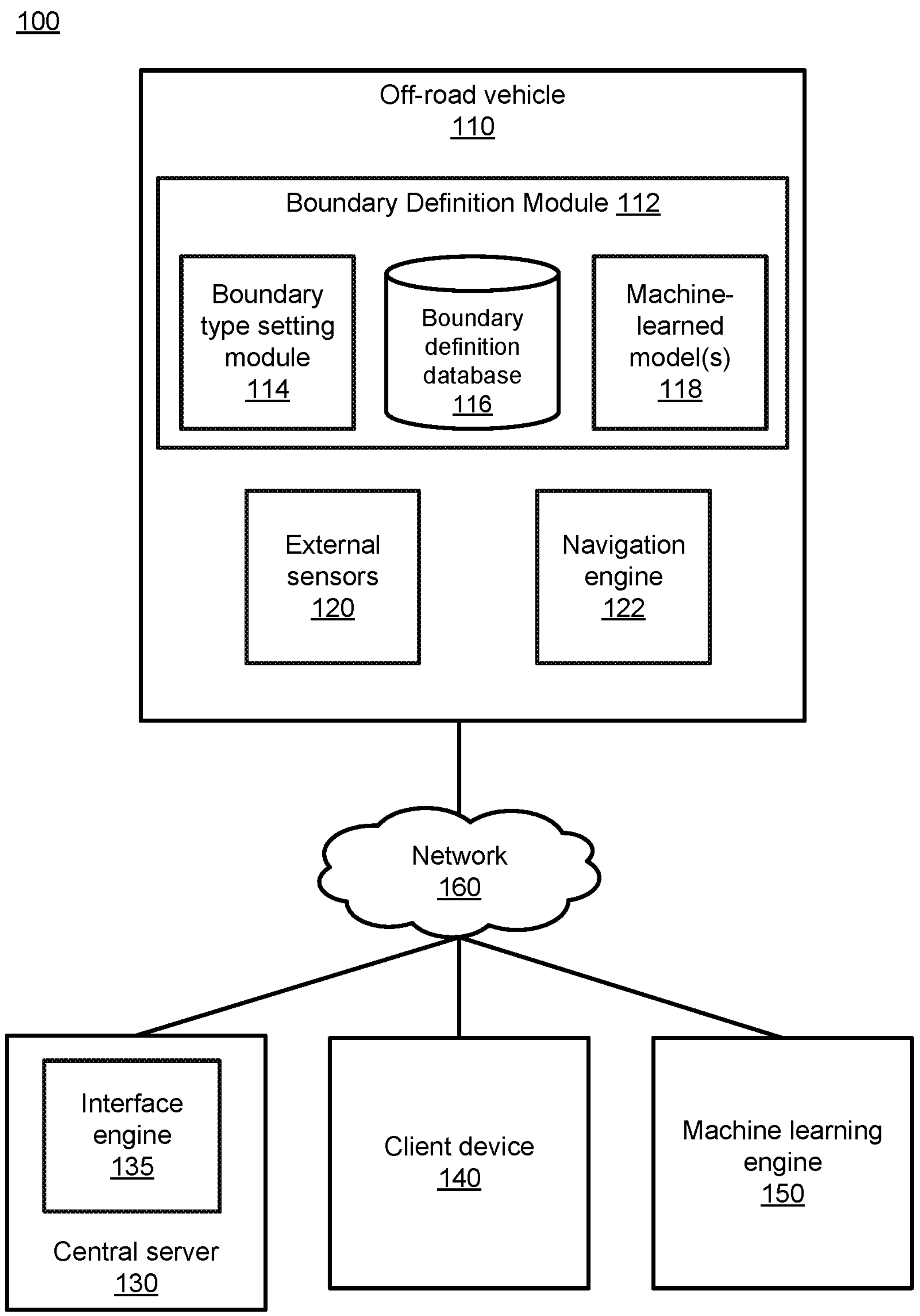
FIG. 1 illustrates an autonomous off-road vehicle system environment, according to various embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Vehicle Behavior Modification Based on Boundary Type

Overview

An autonomous off-road vehicle (AOV) may autonomously navigate in a geographic area once a boundary of the geographic area is defined and a path plan (e.g., guidance plan) corresponding to the defined geographic area is created. Examples of the geographic area include off-road environments like agricultural sites or fields, construction sites, forest or wooded sites, hill or mountain trails or sites, and the like. Examples of off-road vehicles include farming vehicles, tractors, excavators, bulldozers, transport vehicles, delivery vehicles, loaders, or other vehicles configured to operate in an off-road context (e.g., on surfaces other than paved roadway). As used herein, "autonomous" refers to the ability of the off-road vehicle to operate without constant human supervision, for instance enabling the off-road vehicle to move, navigate, perform a function, and/or make a decision without explicitly receiving instructions from a human operator.

For example, for an agricultural field, a boundary of the field may be set (e.g., on a map), and a path plan (e.g., guidance plan) may be created by a guidance system based on the set boundary. The AOV may then utilize the set boundary and the guidance plan to navigate autonomously and perform various farming operations (e.g., tilling, planting seeds, fertilizing plants, treating or spraying plants (e.g., weed or pest treatments), harvesting, and the like) in the field. The boundary may correspond to a geometric border or a peripheral, outer edge of the field, and may also include one or more inner edges within a region defined by the outer edge.

After obtaining the boundary, the guidance system may create guidance tracks (e.g., guidance lines, linear rows of a path plan) the AOV to follow such that, when navigating on a peripheral guidance track, a dimensional edge of the AOV matches up exactly with the boundary. In such a situation, depending on the operation being performed by the AOV, it may be necessary to adjust the operational behavior of the AOV. For example, during spraying operations in the agricultural field, when navigating along the peripheral guidance track where the dimensional edge of the AOV matches up exactly with the boundary of the field, it may be necessary to differently adjust the position of the AOV or component(s) thereof for different portions (e.g., sections, segments) of the boundary (different portions of the peripheral guidance track).

As one example, a first boundary portion may correspond to a fenced boundary portion, and it may be desirable to avoid spraying close to the fence at the first boundary portion because no crop exists there and because the fence is an impassable obstacle. In such a case, it may be desirable to shift the guidance track (and hence, the AOV navigating on the guidance track) inward by a predetermined distance, away from the boundary while navigating along the first boundary portion. As another example, a second boundary portion may correspond to a passable section of the field boundary that is adjacent to another field having a different crop, and it may be desirable to avoid spraying into the adjacent field. This may also be accomplished by shifting the guidance track inward by a predetermined distance, away from the boundary while navigating along the second boundary portion. As yet another example, a third boundary portion may include a fence, a ditch, or another boundary feature where crop exists, and it may be desirable to ensure full spray coverage to the crop at or along the third boundary portion. This may be accomplished by shifting the guidance track outward by a predetermined distance, toward the boundary while navigating along the third boundary portion. In this example, in case the third boundary portion has the fence, it may further be necessary to raise by a predetermined height a spray boom (or a section thereof) of the AOV that is adjacent the fence while spraying the crop at or along the third boundary portion. Raising the section of the spray boom in this manner may be necessary to avoid hitting the fence by having a predetermined clearance relative to the fence.

Conventional systems accomplish the above objectives while conducting operations along the boundary portions by an operator manually operating the AOV and using the AOV's nudge, shift or raise features to manually move the guidance track towards or away from the boundary, to manually raise or lower a component (e.g., boom) of the AOV based on the adjacent boundary portion, or to manually perform another operation to modify vehicle behavior based on the requirements and limitations of the adjacent portion of the boundary. For example, when navigating a guidance track along the boundary, the operator may manually shift the AOV over toward the boundary to overspray a first portion of the boundary (e.g., because crop exists at or along the portion of the boundary and because the boundary is passable) and then shift the AOV back away from the boundary when the particular portion where the overspray is needed ends. Continuing with the example, when navigating the guidance track along a second portion of the boundary that includes a fence and where overspray is needed (e.g., because crop exists at or along the second portion of the boundary), the operator may manually raise up an outside section of a spray boom while navigating the second portion of the boundary (to avoid hitting the fence with the boom), and then lower the section of the spray boom down once the second portion ends. The above-described manual control performed by the operator using the conventional system may further vary depending on the operation being performed by the AOV. Thus, for example, while it may be necessary to shift the AOV toward or away from the boundary in a particular portion of the boundary during the spraying operation (to overspray or to underspray), it may be unnecessary to do the same shifting operation when navigating the same portion of the boundary during, e.g., the tilling operation. Such need for operation-specific manual control makes it difficult to achieve a system that can perform such tasks autonomously.

To overcome the above problems, the present disclosure proposes generating a boundary definition that includes a classification of each of a plurality of boundary portions (e.g., sections, segments) as being of one or more boundary types (e.g., boundary attributes), where each boundary type has one or more predetermined associated vehicle behavior limitations. Thus, instead of treating the entire boundary as a single entity, the present disclosure proposes breaking down the boundary into a plurality of portions and classifying each of the plurality of portions as being of respective one or more boundary types that would respectively specify one or more operational behaviors (e.g., behavior limitations) of the AOV. The present disclosure further proposes determining (e.g., generating, accessing, modifying, setting) a boundary definition that includes the classification, and then utilizing the boundary definition to operate the AOV in the field in a fully autonomous mode.

For a given field or geographic area, the boundary portions and corresponding boundary types may be operation specific (e.g., for the same boundary of the same field, a first set of boundary portions and corresponding one or more boundary types for a first (e.g., spraying) operation, a second set of boundary portions and corresponding one or more boundary types for a second (e.g., tilling) operation, and so on). Further, each boundary type may be associated with respective one or more operational behaviors. For example, an overlap boundary type for a spraying operation may specify that the corresponding boundary portion be over sprayed (e.g., in order to maintain proper weed control) by shifting a guidance track of the AOV by a predetermined distance toward the boundary. As another example, a skip boundary type for a spraying operation may specify that the corresponding boundary portion be under sprayed (e.g., in order to ensure adjacent field crop protection by avoiding spray drift) by shifting the guidance track of the AOV by a predetermined distance inward, away from the boundary.

In some embodiments, the boundary definition including the classification may be set by an operator (e.g., boundary creator operating on a user interface of the AOV or another device). In other embodiments, some or all of the steps to determine the boundary definition including the classification may be automated. For example, a machine-learned model may be trained based on labeled sensor data for each of a plurality of boundary types to perform a classification operation of classifying a given boundary portion based on its sensor data as being of one or more of the boundary types. The system may then apply the trained machine-learned model to sensor data for the current boundary portion to perform the classification operation for the current boundary portion and identify the corresponding one or more boundary types. In some embodiments, the boundary definition may be editable or adjustable by a user.

During an autonomous navigation operation, based on the set boundary definition including the classification, when navigating along a guidance track that is adjacent to the boundary of the field, a navigation engine of the AOV may determine a boundary portion that is adjacent to the AOV (e.g., based on being within a threshold distance from the boundary portion), and query the one or more boundary types associated with the boundary portion to determine operational behavior. Thus, for example, if the current boundary portion is of a boundary type that requires overspray, then the navigation system may control to shift the AOV over towards the boundary (e.g., by shifting the guidance track of the AOV by a predetermined distance) to accomplish this objective automatically and autonomously. The AOV may continue to navigate in the shifted position until the AOV determines that it is no longer navigating along that same boundary portion (e.g., based on being further than the threshold distance from the boundary portion). The AOV may further continuously recheck for new boundary types associated with a boundary portion currently adjacent to the AOV and adjust vehicle operational behavior accordingly.

FIG. 1 illustrates an autonomous off-road vehicle system environment 100, according to various embodiments. The environment 100 of FIG. 1 includes an off-road vehicle 110 ("AOV" or simply "vehicle" hereinafter), a central server 130, a client device 140, and a machine learning engine 150, each communicatively coupled via a network 160. It should be noted that in other embodiments, the environment 100 may include different, fewer, or additional components than those illustrated in FIG. 1. For instance, the machine learning engine 150 may be implemented within the central server 130 or may be included within the AOV 110. Likewise, the client device 140 and the central server 130 can be the same device.

The off-road vehicle 110 of FIG. 1 includes a boundary definition module 112, external sensors 120, and a navigation engine 122. The boundary definition module 112 may in turn include a boundary type setting module 114, a boundary definition database 116, and one or more machine-learned models 118. In other embodiments, the AOV 110 (and components thereof) includes fewer, different, or additional components than those illustrated in FIG. 1. For instance, some of the functionality of the AOV 110 (e.g., functionality provided by one or more of the boundary type setting module 114, the boundary definition database 116, and the one or more machine-learned models 118) may be subsumed by one or more of the central server 130, and the client device 140. Other components, such as engines, drivetrains, communication components, structural components, and the like aren't illustrated for the purposes of simplicity.

The boundary definition module 112 may be configured to perform different operations. For example, the operations include a boundary setting operation and a classification operation. The boundary setting operation may include performing an initial step of generating a boundary (e.g., single, common boundary) of a geographic area (e.g., agricultural field) manually and/or automatically. For example, the boundary setting operation may entail by a user manually operating the AOV 110 to navigate along the outer edge or boundary of the field (and along any internal edges) while the external sensors 120 are operated to capture sensor data (e.g., GPS data). As another example, the boundary may be input by a user (e.g., of AOV 110, of central server 130, of client device 140) by making a selection on a map indicating the outer edge or boundary of the field (and any internal edges; e.g., geolocation data). As yet another example, the boundary may be automatically generated (e.g., using one or more machine-learned models 118) as a background process by capturing sensor data with the external sensors 120 while the AOV 110 is being operated in a manual mode in the field to perform various farming operations (e.g., plant a crop (or precursor thereto), treat a crop (or precursor thereto), harvest a crop, or perform another task associated with the crop).

The sensor data captured by the external sensors 120 may include information representative of the surroundings the AOV 110, representative of a current geographic position (e.g., geolocation data) of the AOV, representative of objects, vehicles, or obstructions within a threshold proximity of the AOV, and the like. For example, the sensors 120 can include cameras (e.g., camera array) that capture image data, a location sensor (e.g., GPS receiver, Bluetooth sensor), a LIDAR system, a RADAR system, depth sensors, proximity detectors, or any other component. The sensors 120 may thus be configured to detect one or more of the image data, the location data (e.g., geolocation data) indicating a location of the AOV 110 on a map corresponding to the field, a presence of objects or things within a proximity of the AOV 110, dimensions of any detected objects or things, and the like. The external sensors 120 can be mounted on an external surface or appendage of the AOV 110, can be located within the AOV, can be coupled to an object or surface external to the AOV, or can be mounted to a different vehicle.

Once the boundary is generated with the boundary setting operation, the boundary definition module 112 may perform the classification operation to generate (e.g., modify, access, set, determine) a boundary definition that includes a classification (e.g., classification data) of a plurality of portions of the boundary as being of respective one or more boundary types. The one or more boundary types may specify respective one or more operational behaviors (e.g., behavior limitations) of the AOV 110. To perform one or both of the boundary setting operation and the classification operation, the boundary definition module 112 may utilize one or more of the boundary type setting module 114, the one or more machine-learned models 118, and the external sensors 120. Further, as explained previously, functionality of one or more components of boundary definition module 112 may be subsumed by other components of the environment 100, e.g., central server 130.

In some embodiments, the boundary type setting module 114 performs the classification operation to generate classification data by allowing a user to specify a plurality of portions of the boundary, and for each portion, specify one or more boundary types associated with one or more vehicle behavior limitations. Further, the boundary type setting module 114 may perform the classification operation to generate the classification data for each of a plurality of operations (e.g., tilling, spraying, harvesting, and the like). For example, for the spraying operation, a user may input a selection on a user interface corresponding to the boundary type setting module 114 to specify a first boundary portion of the boundary and further input additional selections to specify one or more boundary types for the first boundary portion, and the user may input a selection on the user interface to specify a second boundary portion of the boundary and further input additional selections to specify one or more boundary types for the second boundary portion. The user may repeat this process for other operations, e.g., tilling, harvesting, and the like.

Each boundary portion may be any size. Non-limiting examples of boundary types for the spraying operation may include an overlap boundary type, a skip boundary type, a passable boundary type, an impassable boundary type, a height-restricted boundary type, a speed-restricted boundary type, a caution boundary type, and a poor signal boundary type.

The overlap boundary type (for the spraying operation) may indicate that the corresponding section of the boundary should be oversprayed. Consequently, the corresponding vehicle behavior limitation may cause the AOV to shift a guidance track of the AOV by a predetermined distance toward the boundary.

The skip boundary type (for the spraying operation) may indicate that the corresponding section of the boundary should be undersprayed. Consequently, the corresponding vehicle behavior limitation may cause AOV to shift the guidance track of the AOV by a predetermined distance away from the boundary.

The height-restricted boundary type (for the spraying operation) may indicate that the corresponding section of the boundary has a height restriction of a set minimum height. Consequently, the corresponding vehicle behavior limitation may cause the AOV to raise a height of a corresponding component (e.g., section of spray boom) by a predetermined height to have at least a predetermined clearance relative to the set minimum height of the corresponding boundary portion.

The speed-restricted boundary type (for the spraying operation) may indicate that the corresponding section of the boundary has a speed restriction. Consequently, the corresponding vehicle behavior limitation may cause the AOV to slow down to a speed that is lower than a threshold speed when navigating the boundary portion having the speed-restricted boundary type.

The caution boundary type (e.g., school zone, high wind zone) may indicate that the corresponding section of the boundary has a caution flag. Consequently, the corresponding vehicle behavior limitation may cause the AOV to issue a notification to an operator or to a remote user when navigating the boundary portion having the caution boundary type, lower the speed of the AOV, and the like.

The poor signal boundary type may indicate that the corresponding section of the boundary has a poor signal reception (e.g., GPS signal). Consequently, the corresponding vehicle behavior limitation may cause the AOV to issue a notification (e.g., to require manual supervision) to an operator or to a remote user when navigating the boundary portion having the poor signal boundary type.

Notably, one boundary portion may be associated with more than one boundary types and the corresponding more than one vehicle behavior limitations may be taken into consideration when autonomously operating the AOV at the boundary portion with more than one boundary types. Thus, for example, when navigating a guidance track along a portion of the boundary that includes a fence (e.g., having height-restricted boundary type) and where crop exists (e.g., overlap boundary type to overspray), the corresponding vehicle behavior limitations may cause the AOV to shift a guidance track of the AOV by a predetermined distance toward the boundary while also raising a height of a corresponding component (e.g., section of spray boom) by a predetermined height.

Other embodiments of the boundary type setting module 114 may perform the classification operation based on other mechanisms. For example, historical data of maneuvering operations performed by the AOV 110 (and/or other vehicles) when navigating different portions of the boundary (of the current field and/or other historical fields) may be recorded, and the data may be used to set the boundary types for the different portions of the boundary and autonomously operate the AOV 110 by "playing back" the maneuvering operations that were historically performed at the current boundary portion.

As another example, one or more machine-learned models 118 may be trained using labeled sensor data corresponding to the different boundary types, and the trained machine-learned models 118 may be deployed on the AOV 110 so that when navigating the AOV 110 along different portions of the boundary, sensor data captured by the external sensors 120 may be input to the one or more machine-learned models 118 to perform the classification operation of classifying each boundary portion as being of the one or more boundary types. The machine-learned models 118 may thus be configured to perform a plurality of operations (e.g., the boundary setting operation, the classification operation). A result of the classification operation may be output as the classification data from the machine-learned model 118. In some embodiments, the machine-learned model 118 is trained on a training corpus of tagged images and is configured to perform one or more computer vision classification operations based on the training to generate the classification data. In some embodiments, the machine-learned model 118 is trained based on a training set of data that includes historical images and corresponding classifications (e.g., skip boundary type, overlap boundary type, passable boundary type, impassable boundary type, height-restricted boundary type, and the like) based on an identity of objects, things, regions, or entities present within the images. In some embodiments, the machine-learned model 118 is an algorithm (such as a computer vision algorithm) and is configured to perform the classification operation using one or more of the external sensors 120 of the AOV 110. Additional details of the machine-learned models 118 are provided below in connection with FIG. 2.

In some embodiments, the boundary types identified during the classification operation based on the other mechanisms (e.g., historical activity, machine-learned models, external databases, and the like) may be presented to a user as boundary type candidates for respective boundary portions, and based on user input (e.g., confirmation), the identified boundary type candidates may be associated with the respective boundary portions as the one or more boundary types and included in the boundary definition as the classification data. The system may thus allow a user to set (e.g., edit, modify, approve) the boundary definition that includes the classification data. The boundary definition including the classification data may be stored in the boundary definition database 116 for autonomous operation of the AOV 110.

The navigation engine 122 enables the AOV 110 to perform various operations. For instance, the navigation engine 122 enables the AOV 110 to perform a path planning operation (e.g., guidance planning operation). As another example, the navigation engine 122 enables the AOV 110 to perform an autonomous navigation operation based on the boundary definition including the classification data.

The path planning operation may entail determining and setting one or more path plans or guidance plans for the AOV 110 to cover a crop area defined by the boundary definition in the boundary definition database 116 in an energy efficient manner. Based on the set path plan, the AOV 110 may traverse the entire crop area or a portion thereof to perform various farming operations. The path plan may be executed by the AOV 110 by autonomously navigating over a plurality of linear rows (e.g., guidance tracks, guidance lines), so as to cover the entire crop area while minimizing at least one of a total drive length, a total number of turns, a total drive time, and the like.

The autonomous navigation operation may entail the AOV 110 autonomously navigating within the environment 100 from one location to another. For instance, the navigation engine 122 can, in response to identifying a task or function to be performed by the AOV 110, identify a location associated with the identified task or function, and can select a route from a current location of the AOV to the identified location, and autonomously navigate along the selected route in the environment 100.

The autonomous navigation operation may further entail the AOV 110 autonomously navigating based on the boundary definition in the boundary definition database 116. That is, the navigation engine 122 may control the AOV 110 to navigate the AOV 110 in an autonomous mode to a target portion of the boundary based on the boundary definition, the target portion of the boundary classified as being one or more first target boundary types. And in response to being within a threshold distance (e.g., as defined in the boundary definition) of the target portion of the boundary (e.g., as detected based on the sensor data), the navigation engine 122 may control the AOV 110 to modify a behavior of the AOV based on the one or more vehicle behavior limitations associated with the one or more target boundary types. The autonomous navigation operation based on the boundary definition is further described in connection with an exemplary boundary definition shown in FIG. 3.

Once the boundary definition setting module 112 has performed the boundary setting operation and the classification operation to generate the boundary definition including the classification data, the navigation engine 122 can control to perform the path planning operation and the autonomous navigation operation of the AOV 110. For example, an operator can control to modify an operating mode of the AOV 110 from manual operation to automated operation, and in the automated operation mode, the navigation engine 112 may generate multiple guidance tracks through the field within the boundary to execute the guidance plan related to a farming activity.

The central server 130 is a computing system located remotely from the AOV 110. In some embodiments, the central server is a web server or other computer configured to receive data from and/or send data to one or more autonomous vehicles within the environment 100. In some embodiments, the central server 130 receives information from the AOV 110 and other vehicles indicating a location of the vehicles, the boundary definition including the classification data in the boundary definition database 116, a function or operation being performed by the vehicles, a state of the one or more vehicles, and the like. In some embodiments, the central server 130 receives information describing the surroundings of the AOV 110 (e.g., the sensor data). In some embodiments, the central server 130 receives a real-time feed of data from the AOV 110, such as a real-time video feed of the environment surrounding the AOV. In some embodiments, the central server 130 can provide information to the AOV 110, such as an instruction to perform an operation or function, a navigation instruction (such as a route), and the like. In some embodiments, the central server 130 can enable a remote operator to assume manual control of the AOV 110, and provide manual navigation or operation instructions to the AOV.

In some embodiments, some of the functionality of the AOV 110 may be subsumed by the central server 130. For example, the sensor data from the external sensors 120 may be transmitted by the AOV 110 to the central server 130, and the central server 130 may subsume the functionality corresponding to one or more of the boundary setting operation, the classification operation, the path planning operation, and the autonomous navigation operation.

The central server 130 includes an interface engine 135 configured to generate one or more interfaces for viewing by a user (such as a user of the central server 130 or a user of the client device 140). The user can be a remote operator of the AOV 110, can be an individual associated with the environment 100 (such as a site foreman or a landowner), can be an individual associated with the AOV 110 (such as a repairman, an on-site coordinator, or the like), or can be any other suitable individual. The interface engine 135 can be used by a user to provide one or more instructions to an AOV 110, such as boundary generation instructions, classification instructions, path planning instructions, autonomous navigation instructions, operation or function instructions, remote piloting instructions, and the like.

The interface engine 135 can generate a user interface displaying information associated with the AOV 110, other vehicles, or the environment 100. For instance, the user interface can include a map illustrating a location and/or movement of each AOV 110 within a field, a field boundary that corresponds to a boundary definition associated with the AOV 110 and that is overlaid on the map (see FIG. 3), a path plan generated for the AOV 110 (see FIG. 3), and the like. The user interface can display notifications generated by and/or received from the AOV 110, for instance within a notification feed, as pop-up windows, using icons within the map interface, and the like. By communicatively coupling to multiple AOVs 110, the central server 130 beneficially enables one user to track, monitor, and/or control multiple AOVs simultaneously.

The client device 140 is a computing device, such as a computer, a laptop, a mobile phone, a tablet computer, or any other suitable device configured to receive information from or provide information to the central server 130. The client device 140 includes a display configured to receive information from the interface engine 135, that may include information representative of one or more AOVs 110 or the environment 100. The client device 140 can also generate notifications (such as notifications generated by an AOV 110) for display to a user, such as a text message or operating system notifications. The client device 140 can include input mechanisms (such as a keypad, a touch-screen monitor, and the like), enabling a user of the client device to provide instructions to an AOV 110 (via the central server 130). It should be noted that although the client device 140 is described herein as coupled to an AOV 110 via the central server 130, in practice, the client device 140 may communicatively couple directly to the AOV (enabling a user to receive information from or provide instructions to the AOV without going through the central server 130).

The machine learning engine 150 is configured to access or generate one or more sets of training data, and to train one or more machine-learned models based on the training data. In some embodiments, the machine learning engine 150 may train at least a first machine-learned model to perform the classification operation of classifying the plurality of portions of the boundary as being the one or more boundary types, each boundary type being associated with one or more vehicle behavior limitations. In other embodiments, the machine learning engine 150 may further train a second machine-learned model to perform the boundary setting operation of generating the boundary of the geographic area based on sensor data from the external sensors 120 while the AOV 110 is being operated in a manual mode in the field.

The machine learning engine 150 can access the training data from one or more AOVs 110, the central server 130, the client device 140, external database, historical data, or any other suitable data source. For instance, the training data may include boundary image data of historical fields and labeled as being of different boundary types, labeled as corresponding to different farming operations, labeled as being a passable boundary or an impassable boundary, and the like.

Upon training the machine-learned models, the machine learning engine 150 can provide the machine-learned models to the central server 130 for storage and/or distribution to one or more AOVs 110 of the environment 100, or for performing at the central server 130, one or more of the boundary setting operation, the classification operation, the path planning operation, and the autonomous navigation operation using the trained machine-learned models, based on the sensor data received from the AOV 110. As another example, the machine learning engine 150 can provide the trained machine-learned models directly to the AOV 110 to perform one or more of the various operations described above. Although illustrated as a standalone component in FIG. 1, the machine learning engine 150 can be implemented within a computing system, such as a server or a personal computer, or (as described above) can be implemented within the central server 130, the client device 140, or the AOV 110. Functionality of the machine learning engine 150 is described in greater detail below in connection with FIG. 2.

As noted above, the systems of FIG. 1 are configured to communicate via a network 160, which may include any combination of local area and/or wide area networks, using both wired and/or wireless communication systems. In one embodiment, the network 160 uses standard communications technologies and/or protocols. For example, the network 160 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 160 may be represented using any suitable format, such as hypertext markup language (HTML) or extensible markup language (XML). In some embodiments, all or some of the communication links of the network 160 may be encrypted using any suitable technique or techniques.

Training and Application of the Machine-Learned Models

Figure 2:
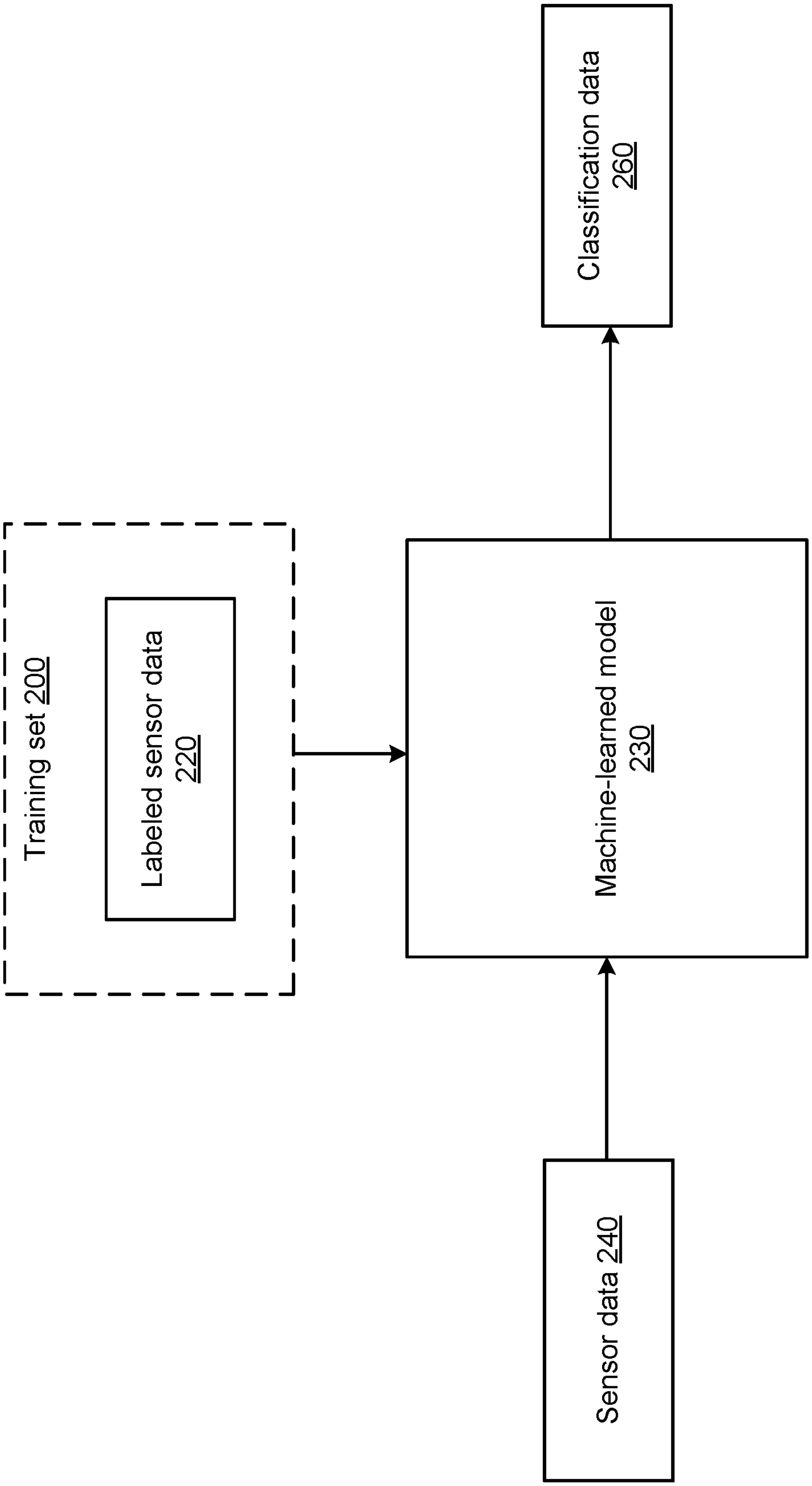
FIG. 2 illustrates the training and application of a machine-learned boundary type classification model, according to various embodiments.

FIG. 2 illustrates the training and application of a machine-learned boundary type classification model 230, according to various embodiments. In the embodiment of FIG. 2, the machine learning engine 150 generates or accesses a training set of data 200 ("training set 200"), which may include labeled sensor data 220. For example, the training set 200 may include labeled sensor data 220 of one or more fields that is labeled as corresponding to one or more boundary types (e.g., overlap boundary type, a skip boundary type, a passable boundary type, an impassable boundary type, a height-restricted boundary type, a speed-restricted boundary type, a caution boundary type, and a poor signal boundary type).

The machine-learned model 230 may be trained using the training set 200 that trains the model to classify each of a plurality of portions of the field boundary as being one or more boundary types. The machine-learned model 230 can be received from the machine learning engine 150, for instance periodically, in advance of the operation of the AOV 110, or in response to a request from the AOV. The machine learning engine 150 can access the training set 200 in advance of training the machine-learned models, in response to a request for a machine-learned model, and the like.

The machine learning engine 150 trains one or more machine-learned models, such as a model configured to perform the boundary setting operation, a model to perform the classification operation, and the like, using respective training sets 200. It should be noted that the machine learning engine 150 can use any of a number of machine learning operations to train the machine-learned model 230. For example, the machine-learned model includes one or more of: a linear support vector machine (linear SVM), boosting for other algorithms (e.g., AdaBoost), a neural network, a logistic regression, a naïve Bayes classifier, a memory based learning, a random forest, a bagged tree, a decision tree, a boosted tree, or a boosted stump.

The machine-learned model 230 is applied to sensor data 240 from the external sensors 120 of the AOV 110 to perform the classification operation. A result of the classification or identification operation performed by the machine-learned model 230 may be output as the classification data 260. The navigation engine 112 may perform the autonomous navigation operation based on the classification data 260 (included in the boundary definition) to automatically modify vehicle behavior and navigate or operate the AOV 110 based on the boundary type(s) of the boundary portion that is within a threshold distance of the AOV 110.

Example User Interface

Figure 3:
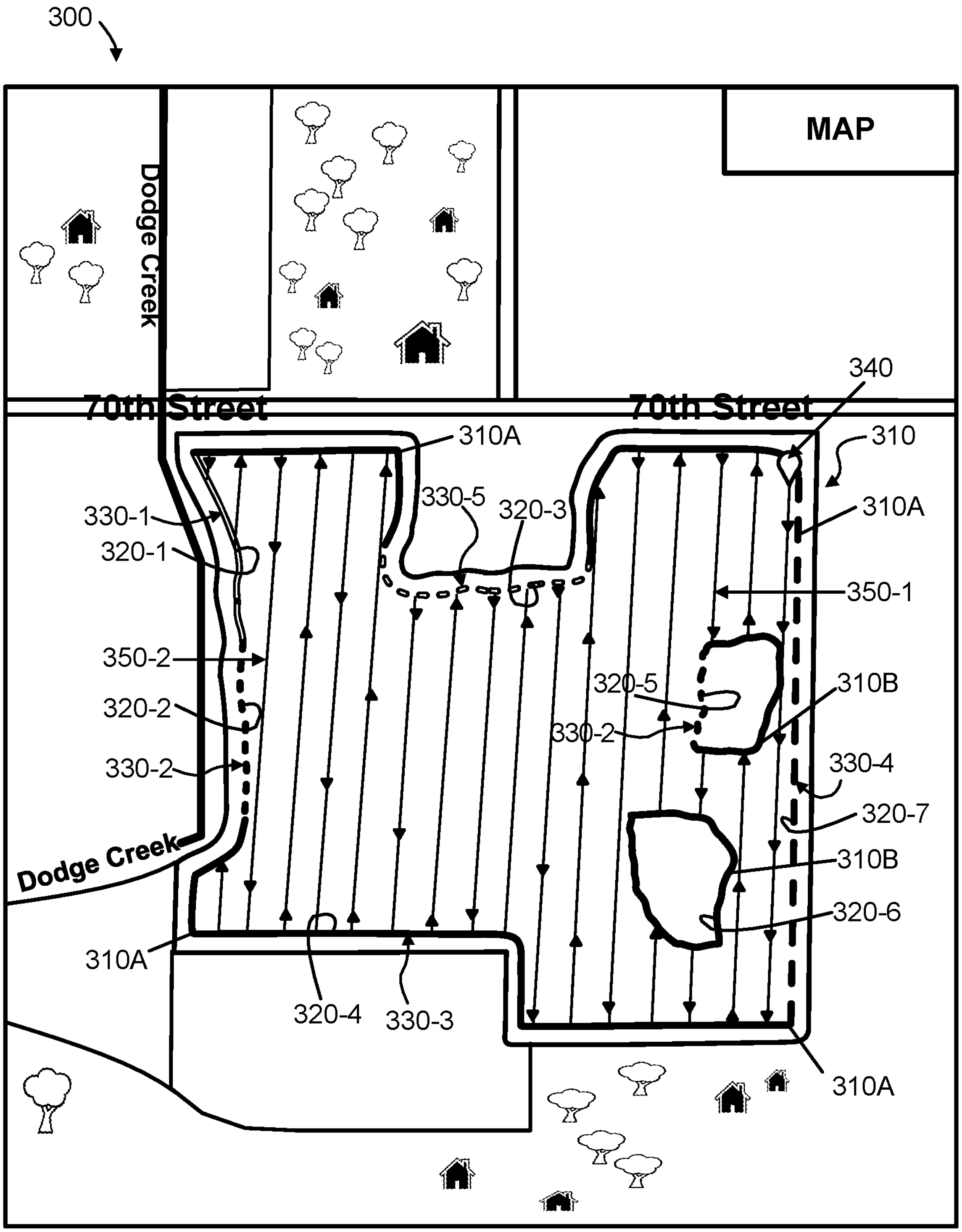
FIG. 3 depicts an exemplary user interface showing a boundary definition including a classification of plural portions of the boundary as being of one or more boundary types.

FIG. 3 depicts an exemplary user interface 300 showing a boundary definition 310 including a classification of each of plural portions 320 (e.g., 320-1, . . . , 320-7) of the boundary as being one or more boundary types 330 (e.g., 330-1, . . . , 330-5). For example, the user interface 300 may be presented to the user of the AOV 110 on a display of the AOV 110 during the autonomous navigation operation. As another example, the interface engine 135 of the central server 130 can generate the user interface 300 to display information associated with the AOV 110 to a user of the central server 130 or the client device 140.

The exemplary user interface 300 shown in FIG. 3 depicts the boundary definition 310 generated by the boundary definition module 112 by performing the boundary setting operation and the classification operation as described above in connection with FIGS. 1 and 2. As shown in FIG. 3, the boundary definition 310 may include the outer edge or boundary 310A of the field and may further include internal edges 310B corresponding to non-navigable areas of the field. The edges 310A and 310B may thus define a crop area within the boundary that corresponds to an area that is navigable by the AOV 110 for the various farming operations.

The boundary definition 310 may include a plurality of boundary portions 320-1, 320-2, . . . , 320-7. Each of the boundary portions 320-1, 320-2, . . . , 320-7 may have one or more corresponding boundary types 330 (e.g., one or more of 330-1, 330-2, . . . , 330-5). In the example illustrated in FIG. 3, the boundary portion 320-1 has boundary type 330-1, the boundary portion 320-2 has boundary type 330-2, the boundary portion 320-3 has boundary type 330-5, and so on. In the example of FIG. 3, the boundary portions 320-2 and 320-5 have the same boundary type 330-2. Also, although not specifically illustrated in FIG. 3, one boundary portion (e.g., one of 320-1, 320-2, . . . , 320-7) may have more than one corresponding boundary types (e.g., more than one of 330-1, 330-2, . . . , 330-5). The number of boundary types and the number of boundary portions included in the boundary definition is not intended to be limiting.

After generating the boundary definition by performing the boundary setting operation and the classification operation, a user may perform the above-described path planning operation to determine and set a path plan 340 for the AOV 110 to cover the entire crop area within the field in an energy efficient manner. Based on the set path plan 340, the AOV 110 may be operated to perform the autonomous navigation operation of traversing the entire crop area to perform a farming operation (e.g., tilling, planting, treating, harvesting). The autonomous navigation operation may entail the AOV 110 autonomously navigating over a plurality of linear rows 350 (e.g., 350-1, 350-2, and the like; guidance lines, guidance tracks) so as to cover the entire crop area while minimizing at least one of a total drive length, a total number of turns, a total drive time, and the like.

As illustrated in the exemplary user interface 300 of FIG. 3, during the autonomous navigation operation, the AOV 110 may navigate along a guidance path (e.g., navigate to a target portion) that is based on the path plan 340 and that is along or adjacent to a boundary (e.g., guidance track 350-2) of the field. During the navigation, in response to the AOV 110 detecting (e.g., based on the sensor data from the sensors 120) that the AOV 110 (or a component of the AOV 110) is within a threshold distance of the boundary portion 320-1, the navigation engine 122 may automatically modify a behavior of the AOV 110 based on the one or more vehicle behavior limitations associated with the boundary type 330-1 corresponding to the boundary portion 320-1. Further, in response to the AOV 110 detecting (e.g., based on the sensor data) that the AOV 110 (or a component of the AOV 110) is no longer within the threshold distance of the boundary portion 320-1, the navigation engine 122 may automatically "undo" the behavior modification of the AOV 110 that was performed based on the one or more vehicle behavior limitations associated with the boundary type 330-1 corresponding to the boundary portion 320-1. Still further, as the AOV 110 continues to navigate along the guidance track 350-2, in response to the AOV 110 detecting that the AOV 110 (or a component of the AOV 110) is now within a threshold distance of the boundary portion 320-2, the navigation engine 122 may automatically modify the behavior of the AOV 110 based on the one or more vehicle behavior limitations associated with the boundary type 330-2 corresponding to the boundary portion 320-2. And the AOV 110 may further "undo" this behavior modification when navigation within the threshold distance of the boundary portion 320-2 has ended.

Consider an exemplary boundary definition for a spray operation by the AOV 110, in which the boundary type 330-1 is the skip boundary type whose vehicle behavior limitation indicates that the guidance track for the skip boundary type has to be shifted away from the boundary by 1 meter, and the boundary type(s) 330-2 is a height-restricted boundary type and an overlap boundary type whose vehicle behavior limitations indicate that the guidance track has to be shifted toward the boundary by 1 meter and the height of the section of the spray boom of the AOV 110 adjacent to the boundary has to be adjusted to have a predetermined height.

For such a boundary definition, continuing with the above example, when operating the AOV 110 in the autonomous navigation mode along the guidance track 350-2, in response to the AOV 110 detecting that the AOV 110 (or a component of the AOV 110) is within a threshold distance of the boundary portion 320-1, the navigation engine 122 may automatically shift the guidance track 350-2 away from the boundary portion 320-1 by 1 meter so as to move the AOV 110 away from the boundary portion 320-1 by 1 meter to underspray in the boundary portion 320-1 thereby, e.g., avoiding spraying into a neighboring field adjacent to boundary portion 320-1. As another example, based on the stored operational behavior and the boundary type, the navigation engine 122 may automatically shut off a section of the boom of the sprayer of the AOV 110 to achieve the underspray in the boundary portion 320-1, to thereby achieve the same result. Further, the navigation engine 122 may further automatically adjust subsequent guidance tracks accordingly for the boundary portion 320-1, based on the shift inward. Still further, in response to the AOV 110 detecting that the AOV 110 (or a component of the AOV 110) is no longer within the threshold distance of the boundary portion 320-1, the navigation engine 122 may automatically shift the guidance track 350-2 back to its original position so as to move the AOV 110 toward the boundary (or undo the shutoff of the section of the boom of the sprayer).

Further, as the AOV 110 continues to navigate along the guidance track 350-2, in response to the AOV 110 detecting that the AOV 110 (or a component of the AOV 110) is now within a threshold distance of the boundary portion 320-2, the navigation engine 122 may automatically shift the guidance track 350-2 toward the boundary portion 320-2 by 1 meter so as to move the AOV 110 toward the boundary portion 320-2 by 1 meter to overspray in the boundary portion 320-2 thereby, e.g., ensuring full spray coverage. Further, the navigation engine 122 may automatically raise a section of a spray boom of the AOV 110 that is adjacent to the boundary portion 320-2 to a predetermined height to ensure the boom has a predetermined clearance in the height-restricted boundary portion 320-2 (e.g., due to a fence or other obstacle). And the navigation engine 122 may also further automatically adjust subsequent guidance tracks accordingly for the boundary portion 320-2, based on the outward shift. Further, in response to the AOV 110 detecting that the AOV 110 (or a component of the AOV 110) is no longer within the threshold distance of the boundary portion 320-2, the navigation engine 122 may automatically shift the guidance track 350-2 back to its original position so as to move the AOV 110 (or a component of the AOV 110) away from the boundary by 1 meter, and also lower the spray boom of the AOV 110 down to its original position. Based on the boundary definition including the classification data, the AOV 110 may thus continue to modify its operational behavior and navigate along the different boundary portions autonomously.

Process for Autonomous Navigation Based on a Boundary Definition

FIG. 4 is a flow chart 400 illustrating a process for autonomous navigation based on a boundary definition including a classification of plural portions of the boundary as being of one or more boundary types, according to various embodiments. It should be noted that the process illustrated herein can include fewer, different, or additional steps in other embodiments. The AOV 110 may access 410 a definition of a boundary corresponding to a geographic area in which the AOV operates. The boundary definition may include a classification of each of a plurality of portions of the boundary as being one or more boundary types, each boundary type associated with one or more vehicle behavior limitations. The AOV 110 may navigate 420 to a target portion of the boundary corresponding to the geographic area, the target portion of the boundary classified as being one or more target boundary types. In response to being within a threshold distance of the target portion of the boundary, the AOV 110 may modify 430 a behavior of the AOV based on the one or more vehicle behavior limitations associated with the one or more target boundary types.

Process of a Central Server for Generating a Boundary Definition

FIG. 5 is a flow chart illustrating a process 500 of a central server 130 for generating a boundary definition including a classification of plural portions of the boundary as being one or more boundary types, according to various embodiments. It should be noted that the process illustrated herein can include fewer, different, or additional steps in other embodiments.

The central server 130 may access 510 a definition of a boundary corresponding to a field in which an autonomous agricultural vehicle (e.g., vehicle 110) operates. The central server 130 may modify 520 the boundary definition by classifying each of a plurality of portions of the boundary as being one or more boundary types, each boundary type associated with one or more vehicle behavior limitations. The central server 130 may provide 530 the modified boundary definition to the autonomous agricultural vehicle. The modified boundary definition may be configured to modify a behavior of the autonomous agricultural vehicle in response to the autonomous agricultural vehicle navigating within a threshold distance of a target portion of the boundary based on the one or more vehicle behavior limitations associated with one or more target boundary types corresponding to the target portion of the boundary.

The system and methods according to the present disclosure provides several advantages. First, specific operational behaviors like intentional over spraying or under spraying a section of a boundary can be automatically employed later, after boundary creation is complete. Second, operator experience and interaction is minimized, and fully autonomous operation is enabled. Third, specific skip/overlap distances or height restrictions could be applied differently for different sections of the boundary, based on the different boundary portions recorded in the boundary definition. Fourth, one single boundary or section of boundary could employ multiple attributes (e.g., multiple boundary types) given the nearby restrictions or field context.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

accessing a farming operation-specific definition of a boundary corresponding to a geographic area in which an autonomous off-road vehicle (AOV) operates, the boundary definition including a classification of each of a plurality of portions of the boundary as being of one or more boundary types, each boundary type associated with one or more vehicle behavior limitations, the AOV being capable of performing a plurality of farming operations;

navigating, by the AOV and when performing a first farming operation, to a first target portion of the boundary corresponding to the geographic area, the first target portion of the boundary classified as being of one or more first target boundary types; and in response to being within a threshold distance of the first target portion of the boundary and when performing the first farming operation, modifying, by the AOV, a behavior of the AOV based on a first vehicle behavior limitation associated with the first farming operation and with the one or more first target boundary types, wherein when performing a second farming operation different from the first farming operation, the first target portion of the boundary is associated with a second vehicle behavior limitation, the second vehicle behavior limitation being different from the first vehicle behavior limitation.

2. The method of claim 1, wherein accessing the boundary definition comprises:

generating the boundary definition corresponding to the geographic area based on a user operation of the AOV in a manual mode;

modifying the boundary definition to include the classification of each of the plurality of portions of the boundary as being of the one or more boundary types; and storing the modified boundary definition on the AOV.

3. The method of claim 2, wherein modifying the boundary definition to include the classification comprises receiving, while operating the AOV in the manual mode, a user selection of, for each of the plurality of portions of the boundary, the corresponding one or more boundary types.

4. The method of claim 1, wherein accessing the boundary definition comprises:

modifying, at a central server, the boundary definition to include the classification of each of the plurality of portions of the boundary as being of the one or more boundary types; and transmitting, from the central server and to the AOV, the modified boundary definition including the classification.

5. The method of claim 4, wherein classifying each of the plurality of portions of the boundary as being of the one or more boundary types comprises, for each of the plurality of portions of the boundary:

accessing sensor data for the boundary portion; and applying a machine-learned model to the sensor data for the boundary portion to perform a classification operation of classifying the boundary portion as being of the one or more boundary types.

6. The method of claim 5, wherein the machine-learned model is trained to perform the classification operation based on labeled sensor data for a plurality of the boundary types.

7. The method of claim 4, wherein classifying each of the plurality of portions of the boundary as being the one or more boundary types comprises, for each of the plurality of portions of the boundary:

determining the one or more boundary types corresponding to the boundary portion based on historical data corresponding to the boundary portion.

8. The method of claim 1, wherein the one or more boundary types comprise at least one of: an overlap boundary type, a skip boundary type, a passable boundary type, an impassable boundary type, a height-restricted boundary type, a speed-restricted boundary type, a caution boundary type, and a poor signal boundary type.

9. The method of claim 8, wherein the overlap boundary type is configured to modify the behavior of the AOV by shifting a guidance track of the AOV by a predetermined distance toward the boundary when performing a spraying operation.

10. The method of claim 8, wherein the skip boundary type is configured to modify the behavior of the AOV by shifting a guidance track of the AOV by a predetermined distance away from the boundary when performing a spraying operation.

11. The method of claim 8, wherein the height-restricted boundary type is configured to modify the behavior of the AOV when performing a spraying operation by adjusting a height of a component of the AOV to have a predetermined clearance relative to an entity at a boundary portion having the height-restricted boundary type.

12. The method of claim 8, wherein the speed-restricted boundary type is configured to modify the behavior of the AOV when performing a spraying operation by lowering a speed of the AOV to be lower than a threshold speed while navigating a boundary portion having the speed-restricted boundary type.

13. The method of claim 1, further comprising:

navigating, by the AOV, to a second target portion of the boundary, the second target portion of the boundary classified as being of one or more second target boundary types; and in response to being within a threshold distance of the second target portion of the boundary, modifying, by the AOV, the behavior of the AOV based on the one or more vehicle behavior limitations associated with the one or more second target boundary types.

14. A method comprising:

accessing, by a central server, a farming-operation specific definition of a boundary corresponding to a field in which an autonomous agricultural vehicle operates, the autonomous agricultural vehicle being capable of performing a plurality of farming operations;

modifying, by the central server, the boundary definition by classifying each of a plurality of portions of the boundary as being of one or more boundary types, each boundary type associated with one or more vehicle behavior limitations; and providing, by the central server, the modified boundary definition to the autonomous agricultural vehicle, the modified boundary definition configured to modify a behavior of the autonomous agricultural vehicle when performing a first farming operation and in response to the autonomous agricultural vehicle navigating within a threshold distance of a target portion of the boundary based on a first vehicle behavior limitation associated with the first farming operation and with one or more target boundary types corresponding to the target portion of the boundary, wherein the modified boundary definition is further configured to modify the behavior of the autonomous agricultural vehicle when performing a second farming operation and in response to the autonomous agricultural vehicle navigating within the threshold distance of the target portion of the boundary based on a second vehicle behavior limitation associated with the second farming operation and with the one or more target boundary types corresponding to the target portion of the boundary, the second farming operation being different from the first farming operation and the second vehicle behavior limitation being different from the first vehicle behavior limitation.

15. The method of claim 14, wherein classifying each of the plurality of portions of the boundary as being of the one or more boundary types comprises, for each of the plurality of portions of the boundary:

receiving, by the central server, sensor data for the boundary portion from the autonomous agricultural vehicle; and applying, by the central server, a machine-learned model to the sensor data for the boundary portion to perform a classification operation of classifying the boundary portion as being of the one or more boundary types.

16. The method of claim 14, wherein classifying each of the plurality of portions of the boundary as being of the one or more boundary types comprises, for each of the plurality of portions of the boundary:

receiving, via a user interface associated with the central server, a user selection of the corresponding one or more boundary types for the boundary portion.

17. The method of claim 14, wherein the one or more boundary types comprise at least one of: an overlap boundary type, a skip boundary type, a passable boundary type, an impassable boundary type, a height-restricted boundary type, a speed-restricted boundary type, a caution boundary type, and a poor signal boundary type.

18. An autonomous off-road vehicle (AOV) comprising:

a hardware processor; and a non-transitory computer-readable storage medium storing executable instructions that, when executed by the hardware processor, cause the AOV to perform steps comprising:

accessing a farming operation-specific definition of a boundary corresponding to a geographic area in which the AOV operates, the boundary definition including a classification of each of a plurality of portions of the boundary as being of one or more boundary types, each boundary type associated with one or more vehicle behavior limitations, the AOV being capable of performing a plurality of farming operations;

navigating, by the AOV and when performing a first farming operation, to a target portion of the boundary corresponding to the geographic area, the target portion of the boundary classified as being of one or more target boundary types; and in response to being within a threshold distance of the target portion of the boundary and when performing the first farming operation, modifying, by the AOV, a behavior of the AOV based on a first vehicle behavior limitation associated with the first farming operation and with the one or more target boundary types, wherein when performing a second farming operation different from the first farming operation, the target portion of the boundary is associated with a second vehicle behavior limitation, the second vehicle behavior limitation being different from the first vehicle behavior limitation.

19. The AOV of claim 18, further comprising one or more sensors, and wherein the executable instructions further cause the AOV to perform steps comprising:

accessing sensor data from the one or more sensors; and applying a machine-learned model to the sensor data to generate the classification of each of the plurality of portions of the boundary as being of the one or more boundary types.

20. The AOV of claim 18, wherein the one or more boundary types comprise at least one of: an overlap boundary type, a skip boundary type, a passable boundary type, an impassable boundary type, a height-restricted boundary type, a speed-restricted boundary type, a caution boundary type, and a poor signal boundary type.

* * * * *